(12) United States Patent
Hsu et al.

(10) Patent No.: US 8,899,700 B2
(45) Date of Patent: Dec. 2, 2014

(54) HOUSING HAVING A CARRIER DEVICE

(71) Applicants: Lite-On Electronics (Guangzhou) Limited, Guangzhou (CN); Lite-On Technology Corp., Taipei (TW)

(72) Inventors: Chin-Pang Hsu, Taipei (TW); Chuan-Feng Chen, Taipei (TW); Chin-Yueh Liu, Taipei (TW)

(73) Assignees: Lite-On Electronics (Guangzhou) Limited, Guangzhou (CN); Lite-On Technology Corp., Taipei (TW)

( * ) Notice: Subject to any disclaimer, the term of this patent is extended or adjusted under 35 U.S.C. 154(b) by 142 days.

(21) Appl. No.: 13/628,179

(22) Filed: Sep. 27, 2012

(65) Prior Publication Data
US 2013/0234570 A1 Sep. 12, 2013

(30) Foreign Application Priority Data

Mar. 6, 2012 (CN) .................... 2012 2 0080774 U
Mar. 6, 2012 (TW) ............................ 101204008 U

(51) Int. Cl.
A47B 81/00 (2006.01)
A47B 97/00 (2006.01)
G06F 1/16 (2006.01)
H05K 5/00 (2006.01)
H05K 7/00 (2006.01)

(52) U.S. Cl.
USPC .................................. 312/223.2; 361/679.58

(58) Field of Classification Search
USPC .......... 312/223.2, 319.1; 361/679.33, 679.34, 361/679.35, 679.36, 679.58
See application file for complete search history.

(56) References Cited

U.S. PATENT DOCUMENTS

| | | | | | |
|---|---|---|---|---|---|
| 6,097,591 | A * | 8/2000 | Ircha | ........................... | 361/679.6 |
| 6,229,696 | B1 * | 5/2001 | Lin et al. | ................... | 361/679.58 |
| 6,669,243 | B2 * | 12/2003 | Katoh et al. | .................... | 292/34 |
| 6,700,776 | B2 * | 3/2004 | Bang et al. | ............... | 361/679.58 |
| 7,182,373 | B2 * | 2/2007 | Yamada | ........................... | 292/32 |
| 7,218,508 | B2 * | 5/2007 | Chen et al. | ............... | 361/679.57 |
| 7,428,146 | B2 * | 9/2008 | Han | ........................ | 361/679.55 |
| 7,433,183 | B2 * | 10/2008 | Huang | ..................... | 361/679.33 |
| 7,492,576 | B2 * | 2/2009 | Lin | .......................... | 361/679.37 |
| 7,548,416 | B2 * | 6/2009 | Lin et al. | .................. | 361/679.33 |
| 7,597,412 | B2 * | 10/2009 | Chen et al. | .................. | 312/223.2 |
| 7,643,280 | B2 * | 1/2010 | Chen | ........................ | 361/679.33 |
| 7,672,124 | B2 * | 3/2010 | Zhang et al. | ............ | 361/679.58 |
| 7,715,177 | B2 * | 5/2010 | Chen et al. | ................ | 361/679.01 |
| 8,238,096 | B2 * | 8/2012 | Zhen et al. | ............... | 361/679.58 |
| 8,416,569 | B2 * | 4/2013 | Chen et al. | .................... | 361/690 |
| 8,605,423 | B2 * | 12/2013 | Chen et al. | ............... | 361/679.33 |
| 8,632,140 | B2 * | 1/2014 | Chen et al. | ................. | 312/223.2 |
| 2002/0172003 | A1 * | 11/2002 | Bang et al. | ..................... | 361/683 |
| 2010/0302723 | A1 * | 12/2010 | Zhen et al. | ................. | 361/679.33 |
| 2012/0326581 | A1 * | 12/2012 | Liu et al. | ..................... | 312/223.2 |
| 2013/0026893 | A1 * | 1/2013 | Chen et al. | ................. | 312/223.2 |

* cited by examiner

Primary Examiner — Daniel Rohrhoff
Assistant Examiner — Kimberely S Wright
(74) Attorney, Agent, or Firm — Rosenberg, Klein & Lee

(57) ABSTRACT

A housing includes a housing body defining a receiving space, having a lateral opening, and including two fixed plates one of which is formed with a latch hole. A carrier device includes a carrier frame rotatably connected between the fixed plates and rotatable into and out of the receiving space through the lateral opening and having at least one first connection part, at least one locking member releasably engaged to the latch hole and including a second connection part slidably connected to the first connection part, and at least one resilient biasing element configured to bias the locking member toward the latch hole.

16 Claims, 8 Drawing Sheets

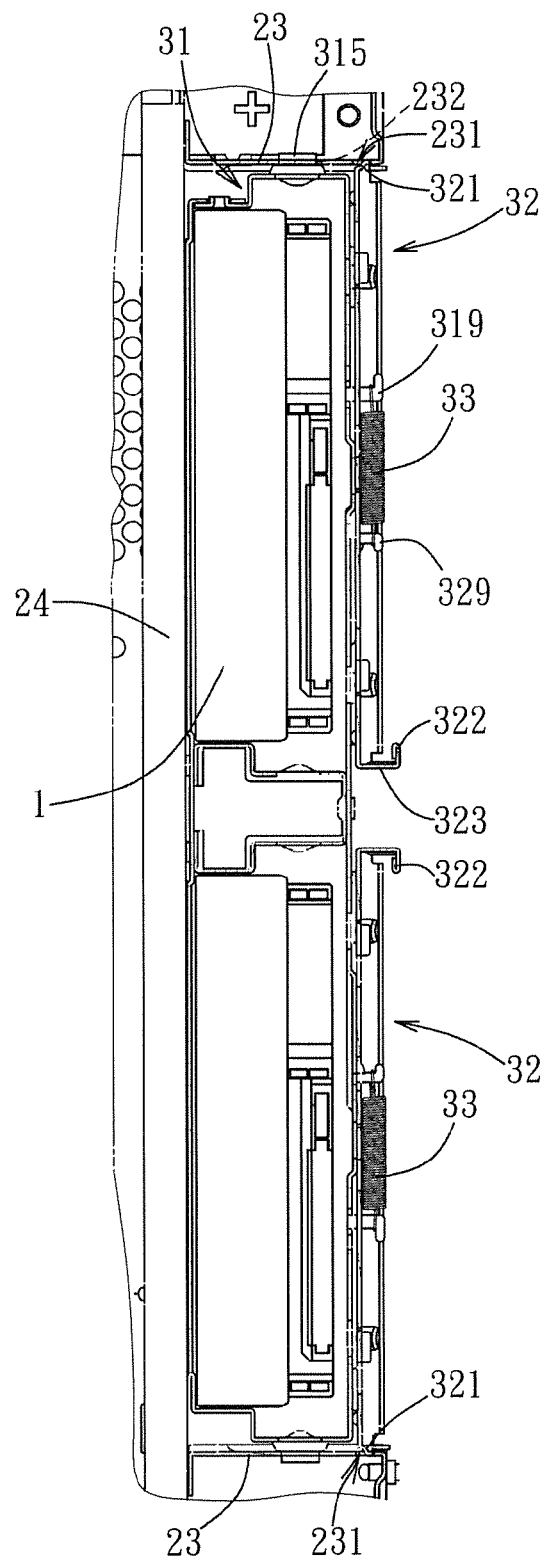
F I G. 5

HOUSING HAVING A CARRIER DEVICE

BACKGROUND OF THE INVENTION

CROSS REFERENCE TO RELATED APPLICATION

This application claims priority of Chinese Patent Application No. 201220080774.6, filed on Mar. 6, 2012.

1. Field of the Invention

The invention relates to a housing, more particularly to a housing having a carrier device.

2. Description of the Related Art

At present, a carrier frame that is mounted inside a housing of a computer or a server for carrying a hard disk drive or an optical disk drive is fixed. Since the trend of the design of computer housings are toward miniaturization, the electronic components are arranged in compact due to the limited space restriction inside the housing. When expanding, upgrading or replacing of the hard or optical disk drive is desired, all electronic components that block a disassembly path of the hard or optical disk drive must be removed first before assembly or disassembly of the hard or optical disk drive can be smoothly performed. Therefore, the assembly or disassembly process of the hard or optical disk drive is rather inconvenient and consumes a lot of working time.

To overcome the aforementioned drawback, the carrier frame is rotatably connected to a housing body of the housing. The carrier frame is first rotated outward of the housing body to facilitate assembly or disassembly of the hard or optical disk drive, and is then rotated back into the housing body. Afterwards, the carrier frame is fixed to the housing body through the use of screws. However, a screw driver is needed to remove the screws and to release fixing of the carrier frame from the housing body so that the carrier frame can be rotated outward relative to the housing body, or to fasten the screws to fix the carrier frame to the housing body. The fixing method using the screws not only causes inconvenience during assembly or disassembly, but also consumes a lot of working time.

SUMMARY OF THE INVENTION

Therefore, an object of the present invention is to provide a housing having a carrier device. A carrier frame of the carrier device is connected to a housing body of the housing using a snap fit method which eliminates the need for fasteners, such as screws, so that the carrier frame can be easily and quickly locked to or disengaged from the housing body.

Another object of the present invention is to provide a housing having a carrier device that can permit easy and quick assembly or disassembly of electronic devices to or from the carrier frame, so that working time for operating the same can be saved.

Still another object of the present invention is to provide a housing having a carrier device that can permit easy disengagement between two locking members and the housing body of the housing using a single hand of a user.

The purpose of the present invention and the solution to the conventional technical problems are achieved through employment of the below technical means. According to a disclosure of the present invention, a housing for mounting of an electronic device comprises a housing body and a carrier device. The housing body defines a receiving space and has a lateral opening that communicates the receiving space with an external environment. The housing body includes two fixed plates oppositely spaced apart from each other. At least one of the fixed plates is formed with a latch hole. The carrier device includes a carrier frame, at least one locking member, and at least one resilient biasing element. The carrier frame is adapted to mount the electronic device and is rotatably connected between the fixed plates. The carrier frame is rotatable into and out of the receiving space through the lateral opening and has at least one first connection part. The locking member is releasably engaged to the latch hole and includes a second connection part slidably connected to the first connection part. The locking member is slidable relative to the carrier frame along a sliding direction through the second connection part to disengage from the latch hole. The resilient biasing element is configured to bias the locking member toward the latch hole.

The purpose of the present invention and the solution to the conventional technical problems can be further achieved through employment of the below technical means.

The resilient biasing element has two opposite ends respectively connected to the carrier frame and the locking member.

The second connection part includes a through slot and a guiding slot communicating with the through slot. The guiding slot is elongated and extends in a direction parallel to the sliding direction of the locking member. The first connection part is configured as an engaging hook extending into the guiding slot through the through slot and hooked to the locking member.

The carrier frame includes a lateral plate. The first connection part has an L-shape and includes a connection arm connected to the lateral plate, and a hook-engaging arm bending from one end of the connecting arm that is distal from the lateral plate. The locking member includes a base plate having the second connection part. The through slot has a size slightly larger than that of the hook-engaging arm. The hook-engaging arm and the connection arm extend out of the base plate through the through slot. The guiding slot has a width smaller than that of the through slot and the hook-engaging arm. The connection arm has a width smaller than that of the guiding slot. The connection arm extends into and is connected slidably to the guiding slot.

The locking member further includes a protruding piece protruding from the base plate and proximate to a long side of the guiding slot. The hook-engaging arm is hooked to the protruding piece. The protruding piece and the hook-engaging arm are in line contact with each other.

The base plate is formed with a long hole extending in a direction parallel to the sliding direction of the locking member. The locking member further includes a first retaining hook projecting from the base plate and spaced apart from the long hole. The carrier frame further includes a second retaining hook projecting from the lateral plate and extending out of the long hole. The resilient biasing element is a tension spring having two opposite ends respectively connected to the first and second retaining hooks.

The locking member includes a latch protrusion engaged releasably to the latching hole. The latch protrusion has an inclined face to abut against the fixed plate which is formed with the latch hole. When the fixed plate abuts against the inclined face, the fixed plate pushes the latch protrusion to deform the resilient biasing element and store a restoring force.

The locking member further includes an operating part that is operable to disengage the latch protrusion from the latch hole.

The housing body further includes a stop wall disposed opposite to the lateral opening to abut against the carrier frame.

Each of the fixed plates is formed with the latch hole. The carrier frame has two first connection parts. The carrier device includes two locking members connected slidably to the carrier frame, and two resilient biasing elements. Each of the locking members includes the second connection part slidably connected to a respective one of the first connection parts, a latch protrusion engaged releasably to the latch hole, and an operating part that is operable to disengage the latch protrusion from the latch hole. The latch protrusions of the locking members are respectively disposed on distal sides of the locking members. The operating parts of the locking members are respectively disposed on proximal sides of the locking members. Each of the resilient biasing elements biases a respective one of the locking members toward the latch hole of a respective one of the fixed plates.

The second connection part of each of the locking members includes a through slot and a guiding slot communicating with the through slot. The guiding slot is elongated and extends in a direction parallel to the sliding direction of the locking member. Each of the first connection parts is configured as an engaging hook extending into the guiding slot through the through slot and hooked to a corresponding one of the locking members.

The carrier frame includes a lateral plate. Each of the first connection parts has an L-shape and includes a connection arm connected to the lateral plate, and a hook-engaging arm bending from one end of the connecting arm that is distal from the lateral plate. Each of the locking members includes a base plate having the second connection part. The through slot has a size slightly larger than that of the hook-engaging arm. The hook-engaging arm and the connection arm extend out of the base plate through the through slot. The guiding slot has a width smaller than that of the through slot and the hook-engaging arm. The connection arm has a width smaller than that of the guiding slot. The connection arm extends into and is connected slidably to the guiding slot.

Each of the locking members further includes a protruding piece protruding from the base plate and proximate to a long side of the guiding slot. The hook-engaging arm of each of the first connection parts is hooked to the protruding piece of a respective one of the locking members. The protruding piece and the hook-engaging arm are in line contact with each other.

The base plate of each of the locking members is formed with a long hole extending in a direction parallel to the sliding direction of the respective one of the locking members. Each of the locking members further includes a first retaining hook projecting from the base plate and spaced apart from the long hole. The carrier frame further includes two second retaining hooks projecting from the lateral plate and respectively extending out of the long holes in the base plates of the locking members. Each of the resilient biasing elements is a tension spring having two opposite ends respectively connected to the first retaining hook of one of the locking members and a corresponding one of the second retaining hooks.

The latch protrusion has an inclined face to abut against a respective one of the fixed plates. When the fixed plate abuts against the inclined face, the fixed plate pushes the latch protrusion to deform a respective one of the resilient biasing elements and store a restoring force.

Through the aforesaid technical means, the advantages and effectiveness of the housing of the present invention reside in that through the configuration of the locking members and the resilient biasing elements, the carrier frame can be connected to the housing body of the housing using a snap fit method which eliminates the need for screws, so that the carrier frame can be easily and quickly locked to or disengaged from the housing body. As such, the electronic device 1 can be easily and quickly assembled to or disassembled from the carrier frame 31, and the working time for operating the same can be saved. Moreover, the carrier device 3 can allow a user to single handedly release a locked state between the locking members 32 and the fixed plates 23 of the housing body 2, so that the operation thereof is simple and easy.

BRIEF DESCRIPTION OF THE DRAWINGS

Other features and advantages of the present invention will become apparent in the following detailed description of the preferred embodiment with reference to the accompanying drawings, of which:

FIG. 5 is a sectional view of the preferred embodiment taken along line V-V of FIG. 1;

DETAILED DESCRIPTION OF THE PREFERRED EMBODIMENT

The above-mentioned and other technical contents, features, and effects of this invention will be clearly presented from the following detailed description of one preferred embodiment in coordination with the reference drawings. Through description of the concrete implementation method, the technical means employed and the effectiveness to achieve the predetermined purposes of the present invention will be thoroughly and concretely understood. However, the enclosed drawings are used for reference and description only, and are not used for limiting the present invention.

Figure 1:
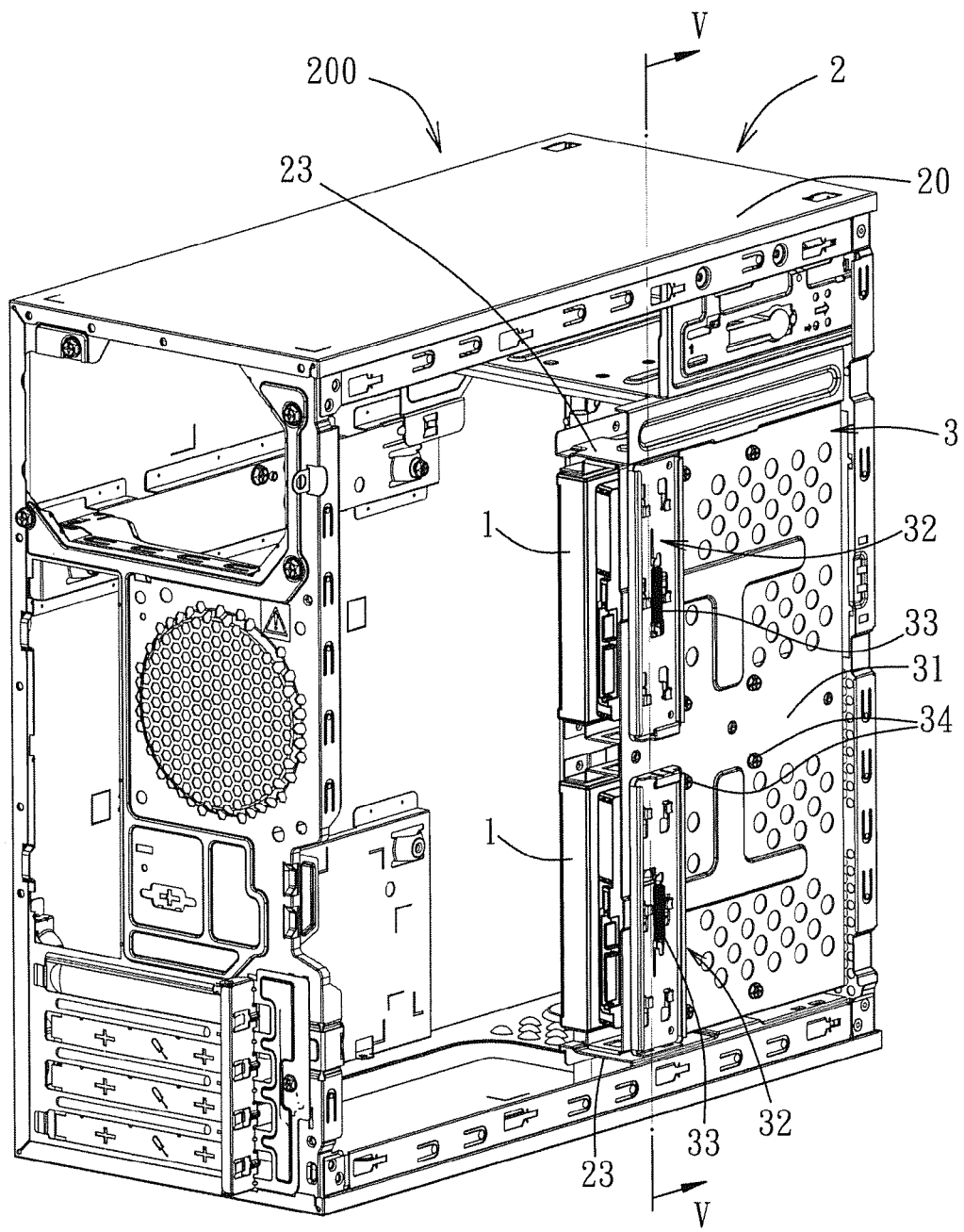
FIG. 1 is a perspective view of a housing having a carrier device according to the preferred embodiment of the present invention.

Referring to FIG. 1, a housing 200 according to the preferred embodiment of the present invention is adapted to mount a plurality of electronic devices 1. In this embodiment, the housing 200 is exemplified as a computer housing, and the electronic devices 1 are exemplified as hard disk drives. Alternatively, the housing 200 may also be a server housing, and the electronic devices 1 may be optical disk drives.

Figure 2:
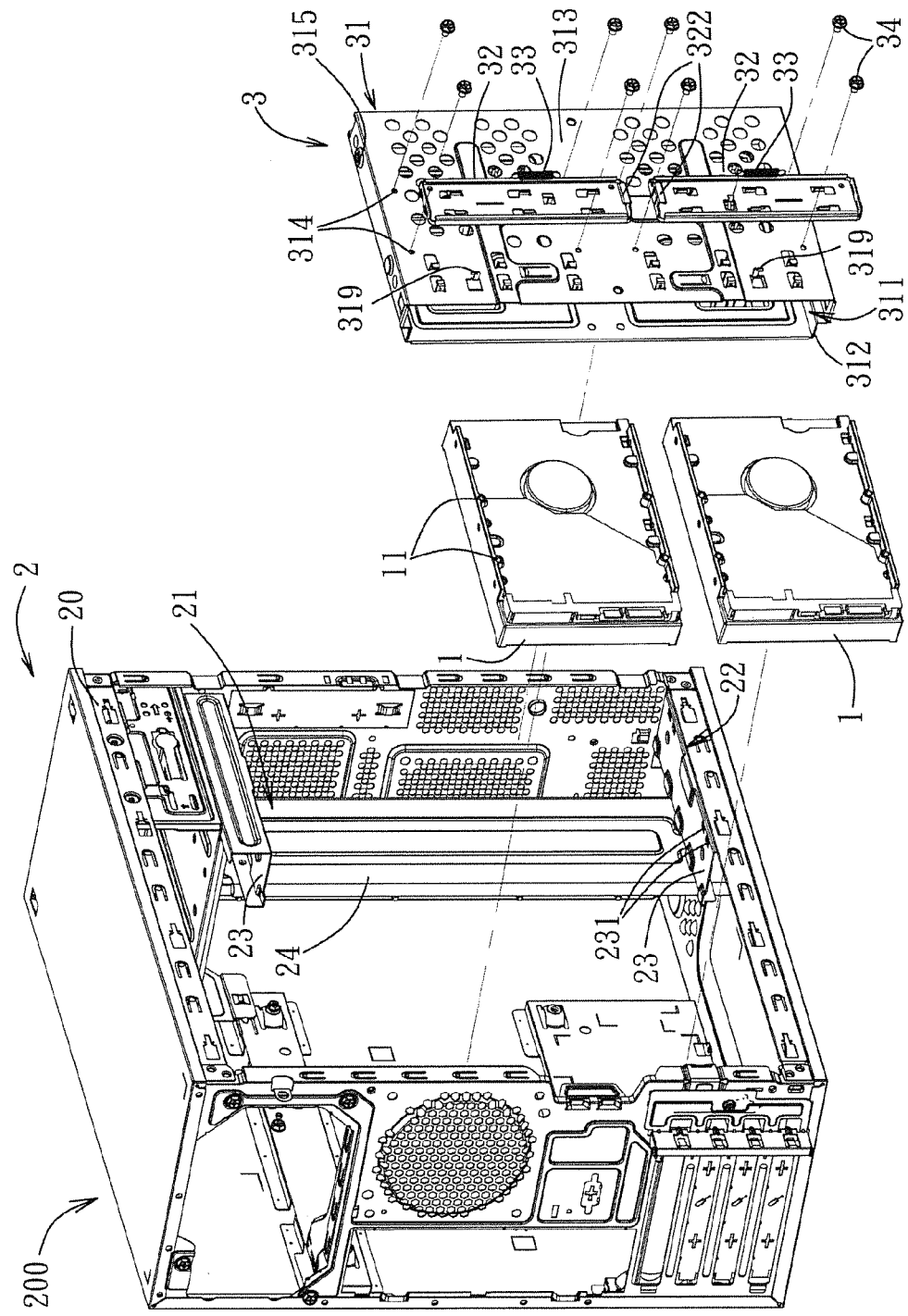
FIG. 2 is an exploded perspective view of the preferred embodiment.

As shown in FIGS. 1 and 2, the housing 200 comprises a housing body 2 and a carrier device 3. The housing body 2 defines a receiving space 21, and has a lateral opening 22 that communicates the receiving space 21 with an external environment. The housing body 2 includes two fixed plates 23 oppositely spaced apart from each other. Each of the fixed plates 23 is formed with two spaced-apart latch holes 231 (only the latch holes 231 in the fixed plate 23 at a bottom side of the housing body 2 is visible in FIG. 2).

Figure 3:
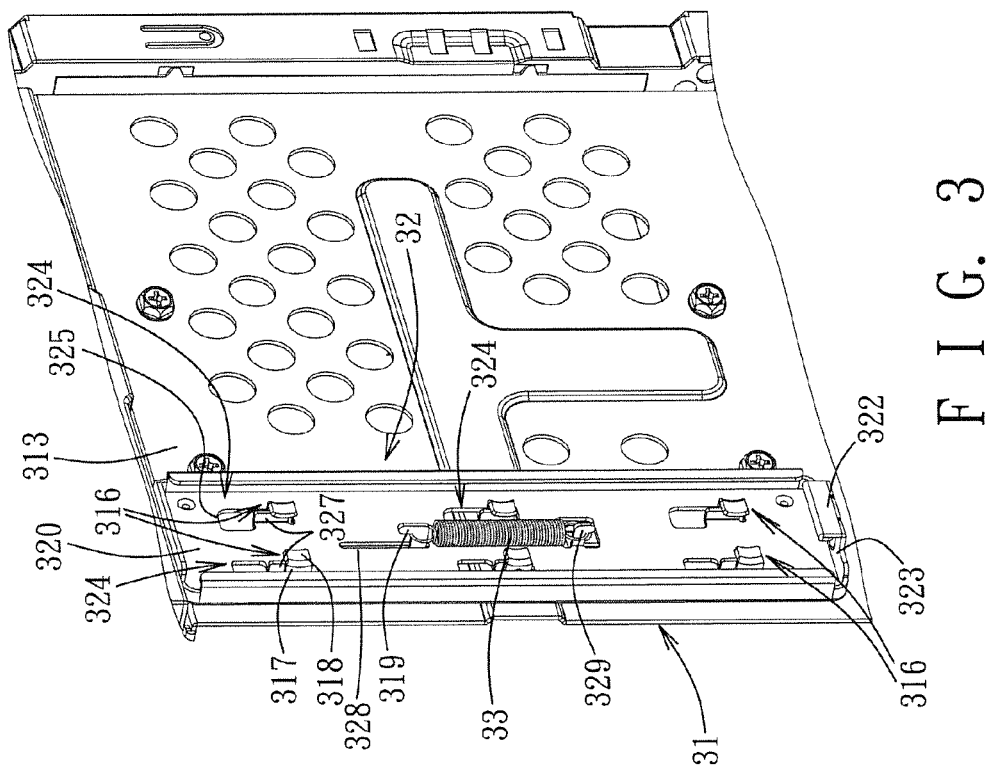
FIG. 3 is a fragmentary enlarged perspective view of the carrier device of the preferred embodiment.
Figure 4:
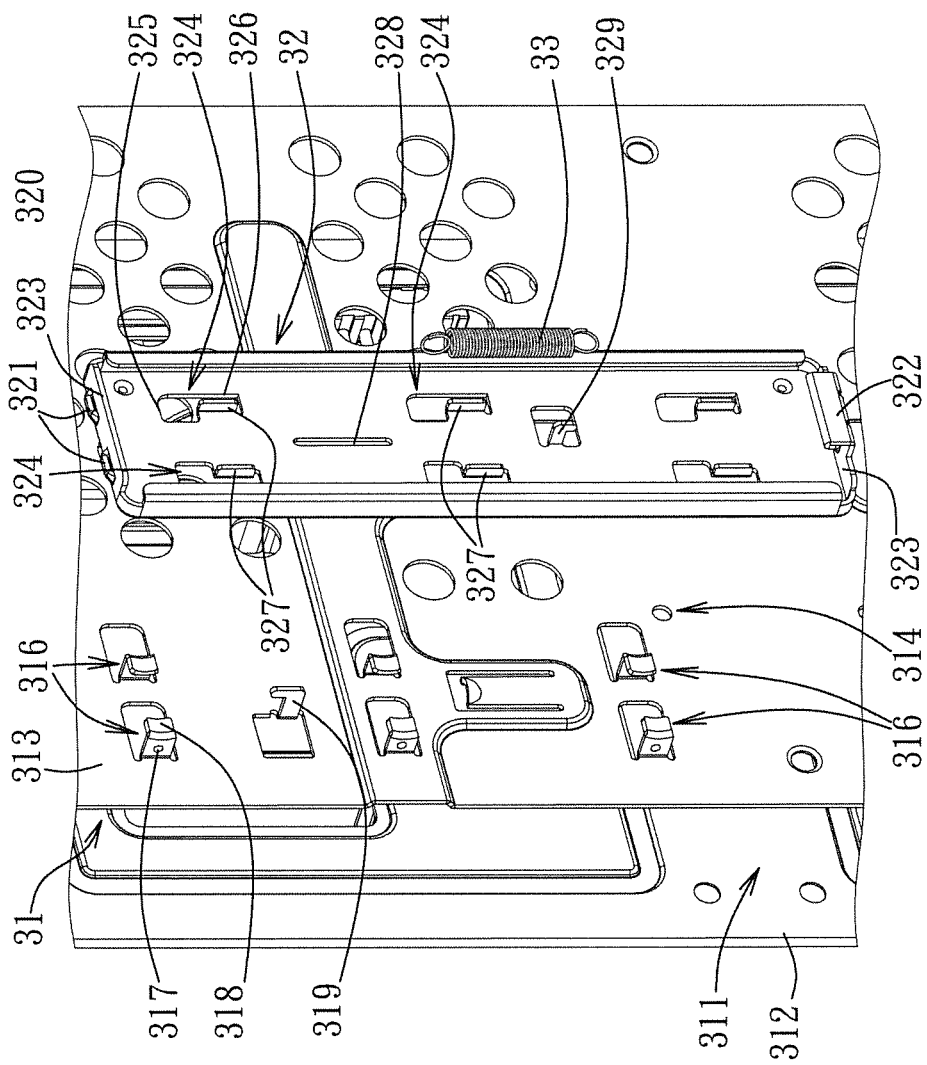
FIG. 4 is another fragmentary enlarged perspective view of the carrier device of the preferred embodiment.

With reference to FIGS. 2 to 4, the carrier device 3 includes a carrier frame 31, two locking members 32 and two resilient biasing elements 33. The carrier frame 31 is adapted to hold the electronic devices 1, is disposed in the receiving space 21, and is rotatably connected between the fixed plates 23. The carrier frame 31 is rotatable into and out of the receiving space 21 through the lateral opening 22, and has at least two first connection parts 316. The locking members 32 are connected slidably to the carrier frame 31. Each of the locking members 32 includes two latch protrusions 321 engaged to the respective latch holes 231 in each of the fixed plates 23, and an operating part 322 that is operable to disengage the latch protrusions 321 from the respective latch holes 231. The latch protrusions 321 of the locking members 32 are respectively disposed on distal sides of the locking members 32. The operating parts 322 of the locking members 32 are respectively disposed on proximal sides of the locking members 32. Each locking member 32 further includes at least one second connection part 324 connected slidably to a corresponding one of the first connection parts 316. Through the slidable connection of the second connection part 324 with the corresponding first connection part 316, each locking member 32 is slidable along a sliding direction relative to the carrier frame 31 so as to disengage the latch protrusions 321 from the respective latch holes 231.

Each of the resilient biasing elements 33 biases a respective one of the locking members 32 toward the corresponding latch holes 231.

Through the slidable connection of the second connection part 324 of each locking member 32 with the corresponding first connection part 316 of the carrier frame 31, and through cooperation of each resilient biasing element 33 that biases the respective locking member 32, the carrier frame 31 can be connected to the housing body 2 using a snap fit method which eliminates the need for fasteners, such as screws, so that the carrier frame 31 can be easily and quickly locked to or disengaged from the housing body 2. As a result, the electronic devices 1 can be easily and quickly assembled to or disassembled from the carrier frame 31, and the working time for assembly or disassembly can be saved.

Below is a detailed description of the concrete structures and mode of operations of the housing body 2 and the carrier device 3.

As shown in FIGS. 1 to 3, for convenience of description, the right side of the housing body 2 in FIG. 1 will be hereinafter referred to as a front end of the housing body 2, whereas the left side thereof will be hereinafter referred to as a rear end of the housing body 2. The two fixed plates 23 are fixed to the housing body 2 within the receiving space 21 through, for example, a screw-fastening method. The fixed plates 23 are proximate to the front end of the housing body 2, and are spaced apart from each other in a top-bottom direction. The distance between the fixed plates 23 is slightly larger than the height of the carrier frame 31 so that the carrier frame 31 can be received between the two fixed plates 23.

The carrier frame 31 defines a holding space 311 for receiving the electronic devices 1, and has a rear mounting hole 312 that communicates the holding space 311 with an external environment. The electronic devices 1 are disposed in the holding space 311 via the rear mounting hole 312. The carrier frame 31 includes an upright lateral plate 313 formed with a plurality of through holes 314. Each electronic device 1 is formed with a plurality of threaded holes 11. By extending screws 34 respectively through the through holes 314 and engaging threadedly the respective threaded holes 11, the electronic devices 1 can be fastened fixedly to the lateral plate 313 and can be stably positioned within the holding space 311. Further, each fixed plate 23 is formed with a pivot hole 232 (see FIG. 5) that is proximate to the front end of the housing body 2. The carrier frame 31 further includes two pivot pins 315 projecting outwardly and respectively from top and bottom sides thereof and disposed in proximity to the front end of the housing body 2. The pivot pins 315 are connected rotatably and respectively to the pivot holes 232 in the fixed plates 23. Through this, the carrier frame 31 is rotatable relative to the fixed plates 23, and is rotatable outwardly of the receiving space 21 via the lateral opening 22, so that the lateral plate 313 and the rear mounting hole 312 of the carrier frame 31 can be disposed outwardly of the housing body 2 to facilitate a maintenance personnel to perform assembly or disassembly of the electronic devices 1.

As shown in FIGS. 2 to 5, in this embodiment, the two locking members 32 are spaced apart from each other in a top-bottom direction and are connected slidably to the lateral plate 313 of the carrier frame 31. The structures of the two locking members 32 are identical. Each locking member 32 includes a rectangular base plate 320, and two end plates 323 connected respectively to top and bottom ends of the base plate 320. The latch protrusions 321 of each locking member 32 project outwardly from an outer face of one of the end plates 323. The operating part 322 of each locking member 32 extends inwardly from an inner face of the other end plate 323. The locking members 32 are connected to the lateral plate 313 such that the operating parts 322 thereof are proximate to each other, and the latch protrusions 321 are distal from each other. Through this, a user can pull single handedly the operating parts 322 of the locking members 32 toward each other to move the latch protrusions 321 of the locking members 32 simultaneously away from the latch holes 231 in the fixed plates 23. Hence, the user can use his/her single hand to easily and simultaneously disengage the locking members 32 from the fixed plates 23. It should be noted that the number of the locking member 32 and that of the resilient biasing element 33 may be one, and only one of the fixed plates 23 is formed with a latch hole 231. Further, the locking member 32 may be formed with one latch protrusion 321 to engage the latch hole 231 in one of the fixed plates 23. Through this, the locking member 32 can be similarly connected to the fixed plates 23 so as to lock the carrier frame 31 to the fixed plates 23 of the housing body 2.

In this embodiment, the base plate 320 of each locking member 32 is formed with a plurality of pairs of second connection parts 324 that are spaced apart from each other in a top-bottom direction. Each pair of the second connection parts 324 are spaced apart from each other in a front-rear direction. The carrier frame 31 includes a plurality of pairs of first connection parts 316 that project from the lateral plate 313 and that are spaced apart from each other in a top-bottom direction. Each pair of first connection parts 316 are connected slidably to a pair of second connection parts 324 of the corresponding locking member 32 and are secured to the corresponding locking member 32. Through this, the locking members 32 can be connected to the carrier frame 31 and can be moved slidably, smoothly and stably on the carrier frame 31 along a sliding direction. The sliding direction in this embodiment refers to a top-bottom direction (see FIGS. 5 and 6).

Each second connection part 324 is formed with a through slot 325 and a guiding slot 326 communicating with one end of the through slot 325. The guiding slot 326 is elongated and extends in a direction parallel to the sliding direction. Each first connection part 316 is configured as an engaging hook that extends into the guiding slot 326 through the through slot 325 and that is hooked to the corresponding locking member 32. By hooking the first connection part 316 to the corresponding locking member 32, the base plate 320 of the locking member 32 can abut against the lateral plate 313 of the carrier frame 31, thereby preventing separation of the locking member 32 from the lateral plate 313 during sliding. By extending the first connection part 316 into the guiding slot 326 to hook against the locking member 32, the locking member 32 is restricted to slide along the length of the guiding slot 326. That is, the locking member 32 is restricted to slide along the sliding direction, and is movable between a locking position (see FIG. 5), where the latch protrusions 321 are engaged to the latch holes 231 in the fixed plates 23, and a release position (see FIG. 6), where the latch protrusions 321 are disengaged from the latch holes 231.

Moreover, each first connection part 316 has an L-shape, and includes a connecting arm 317 connected to the lateral plate 313, and a hook-engaging arm 318 bending from one end of the connecting arm 317 that is distal from the lateral plate 313 to hook against the locking member 32. The through slot 325 has a generally square shape, and has a size slightly larger than that of the hook-engaging arm 318. Through this, the hook-engaging arm 318 and the connection arm 317 can extend through the base plate 320 via the through slot 325. The guiding slot 326 has a width smaller than that of the through slot 325 and that of the hook-engaging arm 318. The connection arm 317 has a width smaller than that of the guiding slot 326. As such, the connection arm 317 can extend slidably and engagingly into the guiding slot 326 to restrict the sliding direction of the locking member 32. When the connection arm 317 slides within the guiding slot 326, the hook-engaging arm 318 abuts against an outer side of the base plate 320, so that separation of the locking member 32 from the lateral plate 313 during sliding can be prevented.

Concretely speaking, each locking member 32 further includes a plurality of pairs of protruding pieces 327 protruding transversely from the base plate 320. Each pair of the protruding pieces 327 are respectively proximate to long sides of a corresponding pair of the guiding slots 326. The hook-engaging arms 318 of each pair of first connection parts 316 abut against the pair of the protruding pieces 327 of the corresponding locking member 32. Through this, each hook-engaging arm 318 can serve its purpose of stopping the respective protruding piece 327 from moving outward to prevent separation of the locking member 32 from the lateral plate 313. Further, because the hook-engaging arm 318 and the protruding piece 327 are in line contact with each other, contact area between the same can be reduced and so is the friction therebetween. As such, the sliding movement of the locking member 32 relative to the carrier frame 31 can be smooth.

It should be noted that the number of the second connection part 324 as well as the number of the protruding piece 327 of each locking member 32 may be one, and the number of the first connection part 316 of the carrier frame 31 may be adjusted according to the number of the second connection part 324 and the protruding piece 327. In other words, the carrier frame 31 may be provided with two first connection parts 316 connected slidably and respectively to the second connection parts 324 of the two locking members 32. Similarly, the locking members 32 can be connected slidably to the carrier frame 31.

With reference to FIGS. 2 to 4, the base plate 320 of each locking member 32 is further formed with a long hole 328 extending in a direction parallel to the sliding direction. Each locking member 32 further includes a first retaining hook 329 projecting transversely from the base plate 320 and spaced apart from the long hole 328. The carrier frame 31 further includes two spaced-apart second retaining hooks 319 projecting transversely from the lateral plate 313, spaced apart in a top-bottom direction, and extending respectively through the long holes 328 in the locking members 32. Each resilient biasing element 33 is a tension spring having two opposite ends connected respectively to the first retaining hook 329 of one of the locking members 32 and a corresponding second retaining hook 319. As such, one end of the resilient biasing element 33 is fixed to the carrier frame 31 through the second retaining hook 319, and the other end thereof can bias the respective locking member 32 to move toward the latch holes 231 in the respective fixed plate 23 through the first retaining hook 329. Further, because the long hole 328 extends in a direction parallel to the sliding direction and the second retaining hook 319 is connected slidably to the long hole 328, one end of the resilient biasing element 33 can be stably secured to the second retaining hook 319 and will not be affected by the sliding movement of the locking member 32.

As shown in FIGS. 1, 3 and 5, through each resilient biasing element 33 that biases the respective locking member 32 to move toward the corresponding latch holes 231, each locking member 32 can be disposed in an engaging position where the latch protrusions 321 are engaged to the latch holes 231 in the respective fixed plate 23, and the connection arms 317 of the first connection parts 316 are disposed in the guiding slots 326 of the second connection parts 324. At this time, the housing body 2 and the carrier device 3 are disposed in a locked state, and the carrier frame 31 is stably positioned in the receiving space 21 in a closed state. It is worth to mention that each resilient biasing element 33 may be a compression spring that biases the end plate 323 of the respective locking member 32 which is connected with the operating part 322. Similarly, the locking member 32 can be disposed in the engaging position.

Figure 6:
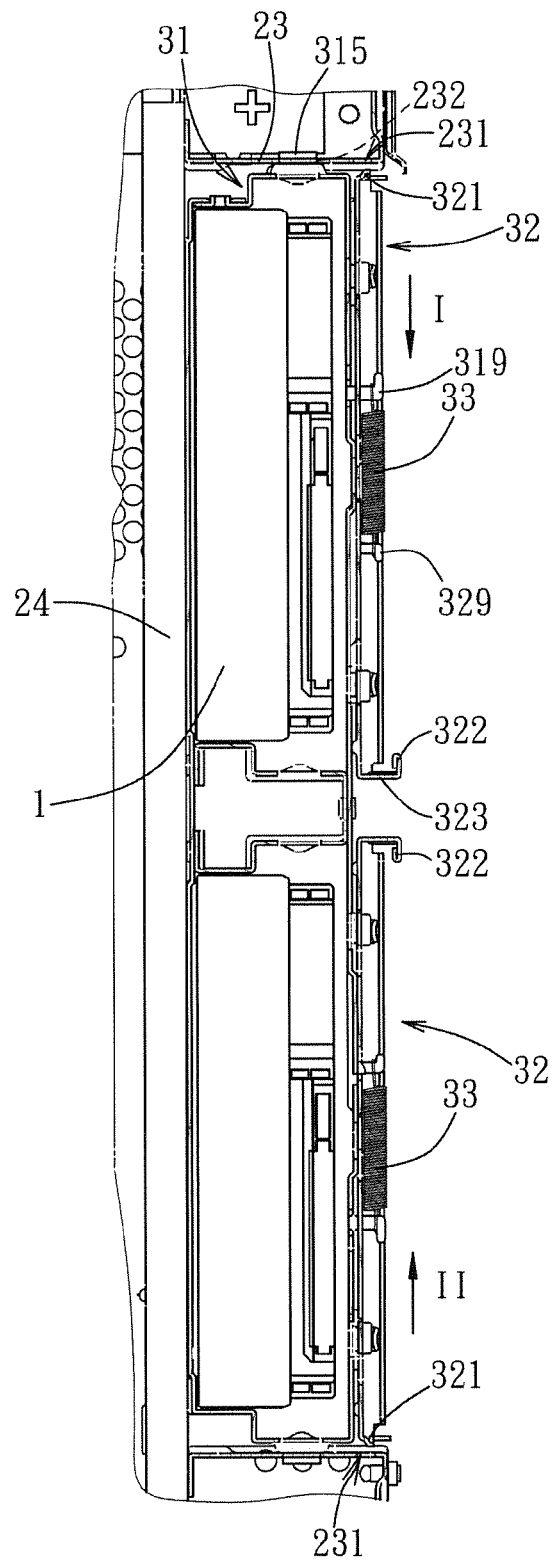
FIG. 6 is a view similar to FIG. 5, but illustrating two locking members being moved toward each other to a release position.
Figure 7:
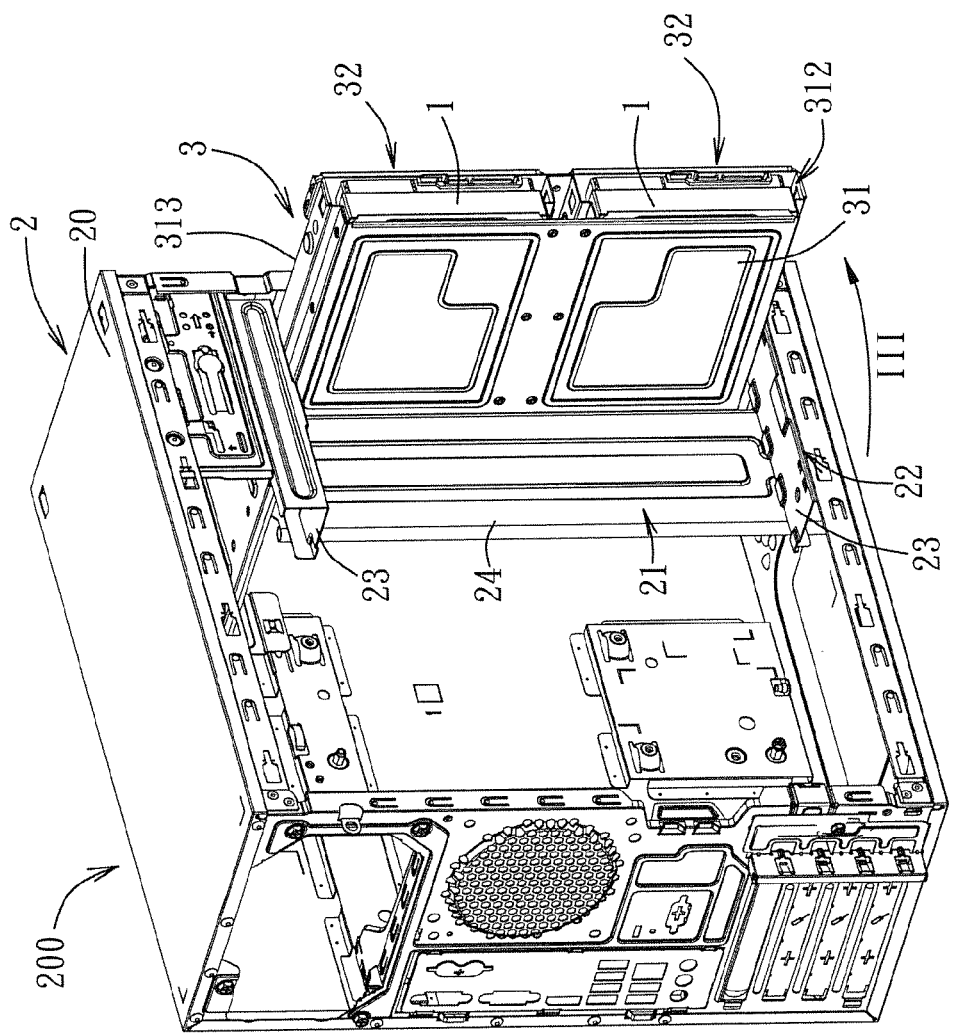
FIG. 7 is a view similar to FIG. 1, but illustrating the carrier frame being pivoted relative to a housing body of the housing to an open position.

With reference to FIGS. 6 and 7, when it is desired to install or remove the electronic devices 1 to or from the carrier frame 31, the user can single handedly pull the operating parts 322 of the two locking members 32 toward each other so as to move the locking members 32 respectively in directions indicated by arrows (I) and (II) toward each other. During sliding of the locking members 32, the first retaining hooks 329 of the locking members 32 will pull the respective resilient biasing elements 33 so as to deform the same and store restoring forces. When the locking members 32 slide to the release position where the latch protrusions 321 are completely disengaged from the latch holes 231 (see FIG. 6), the user can single handedly and simultaneously pull outwardly the operating parts 322 of the locking members 32 so as to rotate the carrier frame 31 relative to the housing body 2 in a direction indicated by an arrow (III) and out of the receiving space 21 via the lateral opening 22. When the carrier frame 31 is rotated to an open position shown in FIG. 7, the user can release the operating parts 322 of the locking members 32, and through the restoring forces of the resilient biasing elements 33, the locking members 32 are restored to their original positions shown in FIG. 7. Since the lateral plate 313 and the rear mounting hole 312 of the carrier frame 31 are disposed at the outer side of the housing body 2 when the carrier frame 31 is in the open position, the user can easily perform assembly or disassembly of the electronic devices 1.

Figure 8:
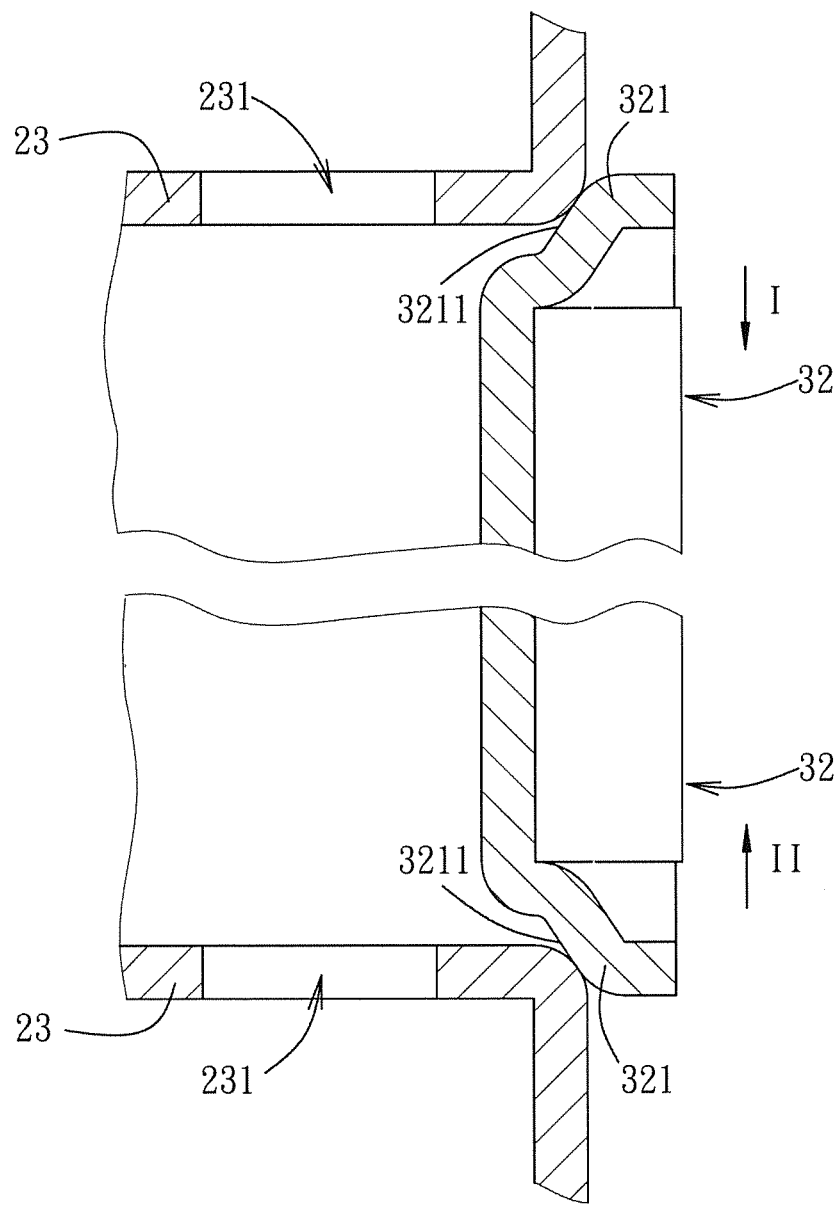
FIG. 8 is an enlarged fragmentary sectional view of the preferred embodiment, illustrating how inclined faces of two latch protrusions abut respectively against fixed plates.

With reference to FIGS. 7 and 8, when it is desired to rotate the carrier frame 31 from the open position to the closed position, the user rotates the carrier frame 31 in a direction opposite to the arrow (III) so as to move toward the lateral opening 22 of the housing body 2. Since the latch protrusion 321 of each locking member 32 has an inclined face 3211 configured to abut against the corresponding fixed plate 23, when the locking members 32 rotate along with the carrier frame 31 until the inclined faces 3211 of the latch protrusions 321 thereof abut against the corresponding fixed plates 23 (see FIG. 8), the fixed plates 23 will press the latch protrusions 321 so that the two locking members 32 move toward each other in the direction of the arrows (I) and (II), respectively. Simultaneously, the first retaining hooks 329 will pull the resilient biasing elements 33 so as to deform and store restoring forces. Since the housing body 2 further includes a stop wall 24 disposed inside the receiving space 21 and opposite to the lateral opening 22, when the carrier frame 31 rotates into the receiving space 21 via the lateral opening 22 and abuts against the stop wall 24, the stop wall 24 will stop the carrier frame 31 from rotating further into the receiving space 21, so that the carrier frame 31 is stopped at the closed position, as shown in FIG. 5. At this time, the latch protrusions 321 of the locking members 32 have moved past the fixed plates 23 to align with the latch holes 231. Through the restoring force of the resilient biasing elements 33, the latch protrusions 321 are engaged to the latch holes 231, thereby restoring the locking members 32 to their original engaging positions. The housing body 2 and the carrier device 3 are also restored to the locked state.

Through the configuration of the inclined faces 3211 of the latch protrusions 321, during closing of the carrier frame 31, the user only needs to rotate the carrier frame 31 along the direction opposite to the arrow (III) to move the carrier frame 31 to the close position via the lateral opening 22 of the housing body 2, and does not need to operate the operating parts 322 of the two locking members 32. Through the single action of rotating the carrier frame 31 from the open position to the closed position and to a locked state with the housing body 2, ease of operation can be enhanced and working hours of operation can be shortened.

In sum, through the slidable connection between the second connection parts 324 of the locking members 32 and the first connection parts 316 of the carrier frame 31, and through coordination of the resilient biasing elements 33 which bias the locking members 32, the carrier frame 31 of the housing 200 of the present invention can be connected to the housing body 2 using a snap fit method which eliminates the need for fasteners, such as screws, so that the carrier frame 31 can be easily and quickly locked to or disengaged from the housing body 2. Through this, the electronic devices 1 can be easily and quickly assembled to or disassembled from the carrier frame 31, and the time for assembly and disassembly operations can be saved. Moreover, the carrier device 3 can allow a user to single handedly release the locked state between the locking members 32 and the fixed plates 23 of the housing body 2, and to single handedly rotate the carrier device 3 to the open position. Through the single action of rotating the carrier frame 31 from the open position to the closed position and to a locked state with the housing body 2, ease of operation can be enhanced and working hours of operation can be shortened. Hence, the objects of this invention can be realized.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A housing for mounting of an electronic device, comprising:
   a housing body defining a receiving space and having a lateral opening that communicates said receiving space with an external environment, said housing body including two fixed plates oppositely spaced apart from each other, at least one of said fixed plates being formed with a latch hole; and
   a carrier device including
      a carrier frame adapted to mount the electronic device and rotatably connected between said fixed plates, said carrier frame being rotatable into and out of said receiving space through said lateral opening and having a lateral plate and at least one first connection part, said first connection part having an L-shape and including a connection arm connected to said lateral plate, and a hook-engaging arm bending from one end of said connecting arm that is distal from said lateral plate,
      at least one locking member releasably engaged to said latch hole and including a base plate having a second connection part slidably connected to said first connection part, said second connection part including a through slot and a guiding slot communicating with said through slot, said locking member being slidable relative to said carrier frame along a sliding direction through said second connection part to disengage from said latch hole, and
      at least one resilient biasing element configured to bias said locking member toward said latch hole;
      wherein said hook-engaging arm and said connection arm extend out of said base plate through said through slot, said connection arm extends into and is connected slidably to said guiding slot.

2. The housing as claimed in claim 1, wherein said resilient biasing element has two opposite ends respectively connected to said carrier frame and said locking member.

3. The housing as claimed in claim 1, wherein said guiding slot is elongated and extends in a direction parallel to said sliding direction of said locking member, and said first connection part is configured as an engaging hook extending into said guiding slot through said through slot and hooked to said locking member.

4. The housing as claimed in claim 3, wherein said through slot has a size slightly larger than that of said hook-engaging arm, said guiding slot having a width smaller than that of said through slot and said hook-engaging arm, and said connection arm has a width smaller than that of said guiding slot.

5. The housing as claimed in claim 4, wherein said locking member further includes a protruding piece protruding from said base plate and proximate to a long side of said guiding slot, said hook-engaging arm being hooked to said protruding piece, said protruding piece and said hook-engaging arm being in line contact with each other.

6. The housing as claimed in claim 5, wherein said base plate is formed with a long hole extending in a direction parallel to said sliding direction of said locking member, said locking member further including a first retaining hook projecting from said base plate and spaced apart from said long hole, said carrier frame further including a second retaining hook projecting from said lateral plate and extending out of said long hole, said resilient biasing element being a tension spring having two opposite ends respectively connected to said first and second retaining hooks.

7. The housing as claimed in claim 1, wherein said locking member includes a latch protrusion engaged releasably to said latching hole, said latch protrusion having an inclined face to abut against said fixed plate which is formed with said latch hole, when said fixed plate abuts against said inclined face, said fixed plate pushes said latch protrusion to deform said resilient biasing element and store a restoring force.

8. The housing as claimed in claim 7, wherein said locking member further includes an operating part that is operable to disengage said latch protrusion from said latch hole.

9. The housing as claimed in claim 1, wherein said housing body further includes a stop wall disposed opposite to said lateral opening to abut against said carrier frame.

10. The housing as claimed in claim 1, wherein each of said fixed plates is formed with said latch hole, said carrier frame having two said first connection parts, said carrier device including two said locking members connected slidably to said carrier frame, and two said resilient biasing elements, each of said locking members including said second connection part slidably connected to a respective one of said first connection parts, a latch protrusion engaged releasably to said latch hole, and an operating part that is operable to disengage said latch protrusion from said latch hole, said latch protrusions of said locking members being respectively disposed on distal sides of said locking members, said operating parts of said locking members being respectively disposed on proximal sides of said locking members, each of said resilient biasing elements biasing a respective one of said locking members toward said latch hole of a respective one of said fixed plates.

11. The housing as claimed in claim 10, wherein said second connection part of each of said locking members includes said through slot and said guiding slot communicating with said through slot, said guiding slot being elongated and extending in a direction parallel to said sliding direction of said locking member, each of said first connection parts being configured as an engaging hook extending into said guiding slot through said through slot and hooked to a corresponding one of said locking members.

12. The housing as claimed in claim 11, wherein each of said first connection parts includes said connection arm connected to said lateral plate, and said hook-engaging arm bending from one end of said connecting arm that is distal from said lateral plate, each of said locking members including a base plate having said second connection part, said through slot having a size slightly larger than that of said hook-engaging arm, said hook-engaging arm and said connection arm extending out of said base plate through said through slot, said guiding slot having a width smaller than that of said through slot and said hook-engaging arm, said connection arm having a width smaller than that of said guiding slot, said connection arm extending into and connected slidably to said guiding slot.

13. The housing as claimed in claim 12, wherein each of said locking members further includes a protruding piece protruding from said base plate and proximate to a long side of said guiding slot, said hook-engaging arm of each of said first connection parts being hooked to said protruding piece of a respective one of said locking members, said protruding piece and said hook-engaging arm being in line contact with each other.

14. The housing as claimed in claim 13, wherein said base plate of each of said locking members is formed with a long hole extending in a direction parallel to said sliding direction of the respective one of said locking members, each of said locking members further including a first retaining hook projecting from said base plate and spaced apart from said long hole, said carrier frame further including two second retaining hooks projecting from said lateral plate and respectively extending out of said long holes in said base plates of said locking members, each of said resilient biasing elements being a tension spring having two opposite ends respectively connected to said first retaining hook of one of said locking members and a corresponding one of said second retaining hooks.

15. The housing as claimed in claim 10, wherein said latch protrusion has an inclined face to abut against a respective one of said fixed plates, when said fixed plate abuts against said inclined face, said fixed plate pushes said latch protrusion to deform a respective one of said resilient biasing elements and store a restoring force.

16. A housing for mounting of an electronic device, comprising:
a housing body defining a receiving space and having a lateral opening that communicates said receiving space with an external environment, said housing body including two fixed plates oppositely spaced apart from each other, each of said fixed plates being formed with a latch hole; and
a carrier device including
a carrier frame adapted to mount the electronic device and rotatably connected between said fixed plates, said carrier frame being rotatable into and out of said receiving space through said lateral opening and having two first connection parts,
two locking members each including a second connection part slidably connected to a respective one of said first connection parts, a latch protrusion engaged releasably to said latch hole of a respective one of said fixed plates, and an operating part that is operable to disengage said latch protrusion from said latch hole, said latch protrusions of said locking members being respectively disposed on distal sides of said locking members, said operating parts of said locking members being respectively disposed on proximal sides of said locking members, each of said locking members being slidable relative to said carrier frame along a sliding direction through said second connection part to disengage from said latch protrusion from said latch hole, and
two resilient biasing elements each configured to bias each of said locking member toward said latch hole of the respective one of said fixed plates.

\* \* \* \* \*